US007707507B1

(12) United States Patent
Rowe et al.

(10) Patent No.: US 7,707,507 B1
(45) Date of Patent: Apr. 27, 2010

(54) METHOD AND SYSTEM FOR CONFIGURING A GRAPHICAL USER INTERFACE BASED UPON A USER PROFILE

(75) Inventors: Rick Rowe, Reno, NV (US); David N. Myers, Reno, NV (US); Marc A. Espin, Sparks, NV (US)

(73) Assignee: IGT, Reno, NV (US)

( * ) Notice: Subject to any disclaimer, the term of this patent is extended or adjusted under 35 U.S.C. 154(b) by 1114 days.

(21) Appl. No.: 09/688,854

(22) Filed: Oct. 16, 2000

(51) Int. Cl.
G06F 3/048 (2006.01)

(52) U.S. Cl. .................. 715/742; 715/707; 715/743; 715/744

(58) Field of Classification Search .............. 345/740, 345/707, 708, 713, 736, 737, 741, 761, 764, 345/765, 771, 779, 839, 745, 747; 707/10, 707/9; 902/23; D21/324; 725/133; 705/18, 705/9; 463/16, 1, 25, 29; 715/743, 745, 715/707, 742, 744
See application file for complete search history.

(56) References Cited

U.S. PATENT DOCUMENTS

| 5,326,104 | A | * | 7/1994 | Pease et al. ................... 463/18 |
| 5,531,441 | A | * | 7/1996 | Dabrowski et al. ............ 463/12 |
| 5,971,271 | A | * | 10/1999 | Wynn et al. .................. 235/380 |
| 6,005,571 | A | * | 12/1999 | Pachauri ...................... 345/764 |
| 6,039,648 | A | * | 3/2000 | Guinn et al. .................. 463/16 |
| 6,219,049 | B1 | * | 4/2001 | Zuffante et al. ............. 345/764 |
| 6,385,652 | B1 | * | 5/2002 | Brown et al. ................. 709/227 |
| 6,462,756 | B1 | * | 10/2002 | Hansen et al. ............... 345/764 |
| 6,554,707 | B1 | * | 4/2003 | Sinclair et al. ................ 463/39 |
| 6,682,421 | B1 | * | 1/2004 | Rowe et al. ................... 463/25 |
| 6,688,973 | B2 | * | 2/2004 | Satloff et al. ................... 463/1 |
| 6,800,029 | B2 | * | 10/2004 | Rowe et al. ................... 463/25 |
| 6,905,409 | B1 | * | 6/2005 | Bradshaw .................... 463/25 |
| 2002/0077169 | A1 | * | 6/2002 | Kelly et al. .................. 463/16 |

* cited by examiner

Primary Examiner—Namitha Pillai
(74) Attorney, Agent, or Firm—Weaver Austin Villeneuve & Sampson LLP

(57) ABSTRACT

The present invention comprises a graphical user interface, including methods and apparatus for configuring and implementing such an interface. One or more embodiments of the invention comprise a graphical user interface comprising a main window including a navigation viewport and a data viewport, the navigation viewport arranged to display navigation selectable elements and the data viewport arranged to display information associated with an application associated with one or more of the navigation selectable elements. One embodiment of the invention comprises a method of configuring a graphical user interface based upon user or device information. One embodiment of the invention comprises a method of controlling the navigation of the graphical user interface based upon user or device information. In a preferred embodiment of the invention, the graphical user interface is associated with a gaming system which includes at least one gaming device.

19 Claims, 7 Drawing Sheets

METHOD AND SYSTEM FOR CONFIGURING A GRAPHICAL USER INTERFACE BASED UPON A USER PROFILE

FIELD OF THE INVENTION

The present invention relates to graphical user interfaces, and more particularly, to the configuration and arrangement of graphical user interfaces.

BACKGROUND OF THE INVENTION

Video displays are commonly used to display information to a user. As is well known, a video display may be associated with a computing device, with the display presenting information regarding the device or one or more operations which may be performed with or by the device. Graphical user interfaces or "GUI's" are commonly used to display this information to a user. These interfaces may have a variety of forms, comprising displayed text and/or objects such as representations of windows, buttons, sliders and the like.

A graphical user interface is generally arranged to make it more simple for the user to obtain information and interact with the computing device. Unfortunately, there are problems which make these functions difficult to achieve.

First, it is often desirable to display on a single display information regarding a plurality of tasks. For example, in a computing environment, a computing device may run several applications at the same time. It is desirable to present information to a user about each of these multiple applications at the same time, or individually in a manner permitting selection between them.

In many instances, multiple users may wish to interact with the computing device. Each of these users may need to interact with the device in a different manner, requiring that different information be displayed to each of these users. In some cases, each of these users may interact with the computing device utilizing the same video display.

In some instances, the apparatus which is used to interact with the computing device may vary. For example, one or more users may interact with a computing device using several different workstations. Some of these work stations may include video displays permitting touch-input only. Other of the work stations may include a keyboard, mouse or other user controllable input device.

It is desirable to provide improved methods and apparatus for configuring and navigating a graphical user interface.

SUMMARY OF THE INVENTION

The present invention comprises a graphical user interface, including methods and apparatus for configuring and implementing such an interface.

One embodiment of the invention comprises a method of configuring a graphical user interface capable of displaying a set of navigation selectable elements. In one embodiment, this method comprises the steps of providing a user identification, determining a user profile utilizing the user identification, determining from the user profile which of the navigation selectable elements of the set of navigation selectable elements which the graphical user interface is capable of displaying which the user is allowed to view, and displaying only the navigation selectable elements the user is allowed to view.

One embodiment of the invention comprises a method of configuring a graphical user interface capable of displaying a set of navigation selectable elements, the navigation selectable elements having a predetermined order. In one embodiment, this method comprises the steps of providing a user identification, determining a user profile from the user identification, determining an access point for the ordered navigation selectable elements for the user from the profile, the access point determining a portion of the navigation selectable elements which are accessible to the user and a portion of the navigation selectable elements which are not accessible to the user based on the order thereof, and displaying only one or more of the navigation selectable elements which are accessible to the user.

One or more embodiments of the invention comprise a graphical user interface comprising a main window including a navigation viewport and a data viewport. The navigation viewport is arranged to display navigation selectable elements and the data viewport arranged to display information associated with an application associated with one or more of the navigation selectable elements. In particular, the data viewport is arranged to display summary information regarding a plurality of items. One or more windows are associated with the data viewport for displaying detailed information regarding one or more of the items having information associated therewith displayed in the data viewport.

In a preferred embodiment of the invention, the graphical user interface is associated with a gaming system. In one embodiment, the gaming system includes at least one gaming device associated with a computing device, and at least a first user station and at least a second user station associated with the system for accessing information regarding the gaming device and for providing input to the computing device. In one embodiment, the first user station is of the type which is adapted to primarily accept touch-input. The second user station is of the type including a plurality of input devices/means, such as a mouse and/or a keyboard.

In accordance with the invention, a graphical user interface is defined which is user specific, such as based upon the type of device which the user uses to access a system or the status or preferences of the user. In one embodiment, all the content which the graphical user interface is capable of displaying is not displayed to a particular user dependent upon the user's profile. In another embodiment, the content of the graphical user interface which the user may access may be limited.

Further objects, features, and advantages of the present invention over the prior art will become apparent from the detailed description of the drawings which follows, when considered with the attached figures.

DETAILED DESCRIPTION OF THE INVENTION

The invention is an improved graphical user interface. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises an improved graphical user interface, including methods and apparatus for configuring, implementing and navigating such a graphical user interface. In one or more embodiments, the graphical user interface has navigation and data display portions. In one or more embodiments, the graphical user interface configuration is user or location specific. These and other aspects of the invention will become apparent from the figures and the description provided.

Figure 1:
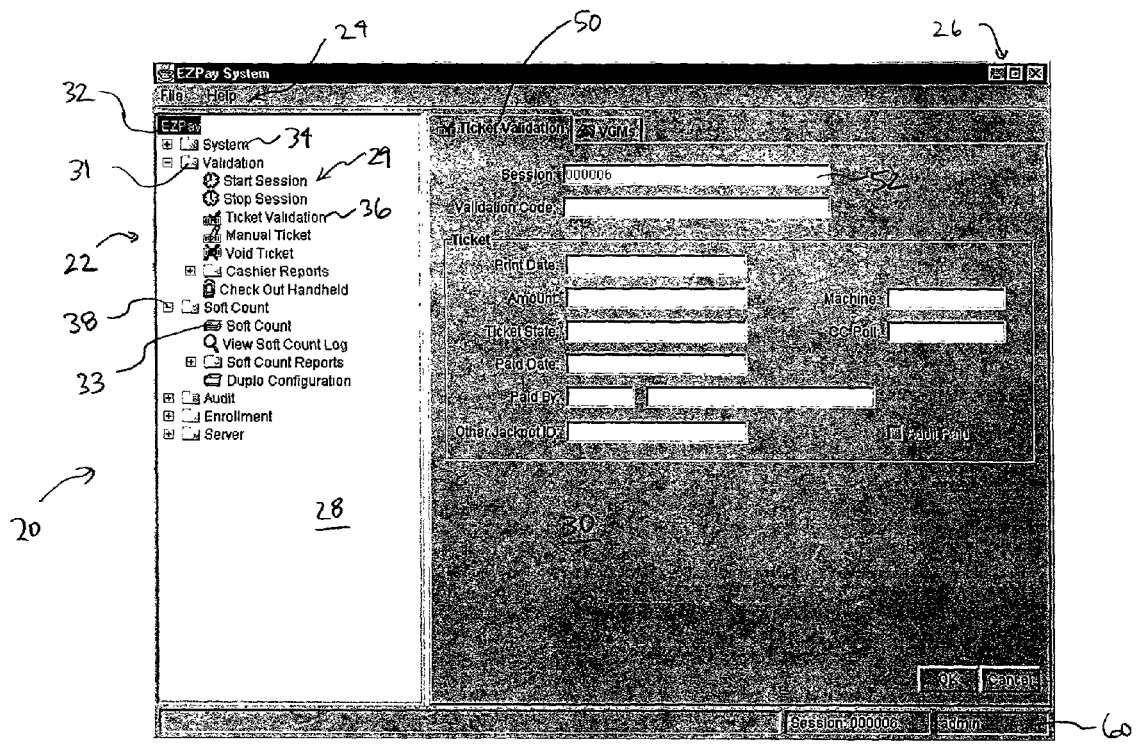
FIG. 1 illustrates a graphical user interface in accordance with an embodiment of the present invention.

Referring to FIG. 1, in one embodiment of the invention there is provided a graphical user interface 20. As is well known, graphical user interfaces are arranged to display information regarding an application or other element associated with a computing device. In a preferred embodiment of the invention, the graphical user interface 20 is associated with a single main application having one or more sub-applications or functions. One specific type of application with which the graphical user interface 20 of the invention may be associated is a gaming system ticket and accounting application, as described in more detail below. In general, the graphical user interface 20 of the present invention is arranged to display information associated with the application and permit interaction with (e.g. provide input to the application) the computing device which is running or performing the application.

In a preferred embodiment, the graphical user interface 20 includes a main window 22. The main window 22 may comprise a variety of elements having a variety of shapes and sizes. In general, the main window 22 comprises an element displayed on or by a device, such as a video screen.

In a preferred embodiment, when displayed, the main window 22 permits interaction with an application or function being performed by an associated computing device. In the embodiment illustrated, the main window 22 includes one or more menu elements 24 and one or more control buttons 26. As illustrated, menu elements 24 are provided for causing the computing device to display help information and file information. Such menu elements are well known. In addition, control buttons 26 are provided permitting a user to reduce the size of the main window 22 for viewing of other information displayed by the display, for enlarging the window 22, and for ending the operation of the interface 20 and, in one or more embodiments, the application(s) with which the interface 20 is associated.

In one or more embodiments, the graphical user interface 20 includes a navigation member 28 and a data display member 30. In a preferred embodiment, each of these members 28,30 is associated with the main window 22. As illustrated, the navigation member 28 comprises a portion or field of the main window 22. This portion of the main window 22 may be referred to as a navigation panel, window or viewport. The data display member 30 also comprises a portion or field of the main window 22. This portion of the main window 22 may be referred to as the data panel, window or viewport.

The navigation member 28 is arranged to display a variety of information to a user. In one embodiment, as illustrated in FIG. 1, the navigation member 28 is arranged to display one or more navigation selectable elements 29. A variety of navigation selectable elements 29 may be provided.

In one or more embodiments, the navigation selectable elements 29 include container elements 31, represented in FIG. 1 as folders and textual descriptors. In general, a container element 31 is an element which contains other elements or information. In addition, the navigation selectable elements 29 may include application initiating elements 33. As illustrated in FIG. 1, application initiating elements 33 may be represented by graphical icons and textual descriptors. In general, the application initiating elements 33 comprise elements which, when selected, cause an application to be initiated or run. It will be appreciated by those of skill in the art that a variety of elements, including text and/or graphical objects, may comprise the navigation selectable elements 29.

In one or more embodiments of the invention, the navigation selectable elements 29 are arranged based on one or more criteria. In a preferred embodiment, the navigation selectable elements 29 are arranged in a hierarchical format which reflects an arrangement or interrelationship of functions of the application or other information. In one embodiment, the navigation selectable elements 29 are arranged into a plurality of levels or layers. In other embodiments, the navigation selectable elements 29 may be arranged in a simple linear ordering.

In one embodiment, the navigation selectable elements 29 are displayed in a hierarchical format. The entire arrangement of the navigation selectable elements 29 may be referred to as a navigation tree. Such an arrangement is illustrated in FIG. 1. In this embodiment, the top of the tree identifies the main application or function 32 with which the interface 20 is associated. Below the main function 32 is an identification of each sub-function or sub-application of the main application 34. Below each sub-application 34 is an identification of each sub-feature or function 36 associated with that sub-application 34, and so on, as is necessary to graphically depict the format of the application, including its various parts or related elements. Related sub-functions or applications of the main application 32 may be grouped together. For example, one navigation selectable element 29 may comprise a container element/folder 31 which contains a plurality of related applications.

In a preferred embodiment, a user may elect to display the contents of a container element 31. In one embodiment, the navigation tree is expandable and compressible. As illustrated, a control button 38 is associated with each container element 31. The control button 38 controls whether the contents of the container element 31 are displayed. In one embodiment, the control button 38 illustrates a "−" sign if the container element 31 contents are displayed, and a "+" sign if not. By selecting a "+" sign, the contents of the container element 31 (if any) are caused to be displayed. By selecting a "−" sign, the contents of the container element 31 (if any) are caused not to be displayed. As will be appreciated, these selections may be made with a wide variety of input devices, such as by the touch of a touch-sensitive display in the area of the displayed control button 38 or by alignment of a mouse-pointer with the control button 38 and selection with an "enter" keyboard button or mouse button, as is well known.

Figure 2:
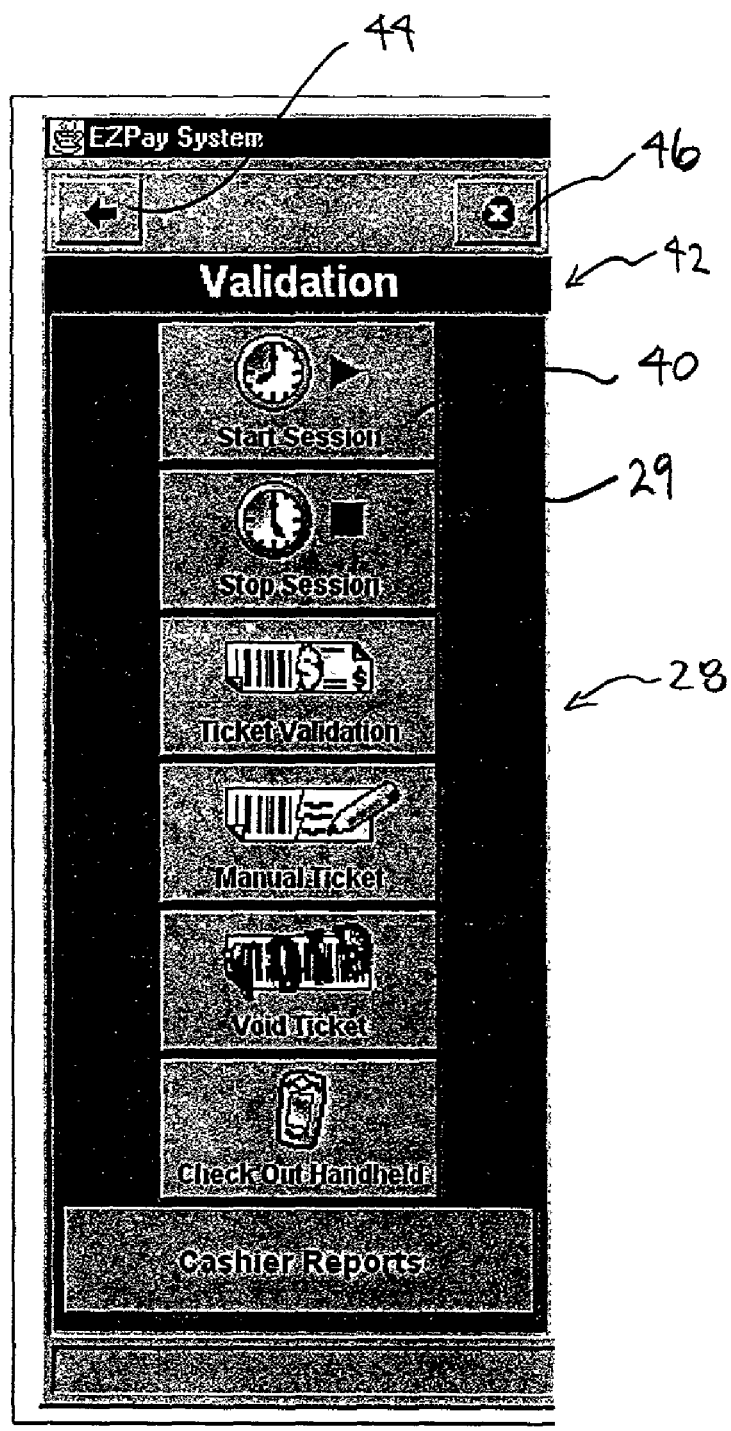
FIG. 2 illustrates one embodiment of a navigation element of a graphical user interface of the present invention.

Referring now to FIG. 2, in another embodiment of the invention, the navigation selectable elements 29 may simply comprise buttons 40 or other graphical selection elements.

Further, these buttons 40 or other elements, while representing the same information, need not be arranged in the hierarchical tree or menu format as illustrated in FIG. 1. In one embodiment, the navigation member 28 includes a heading 42 which identifies the particular main application or function with which each of functions having a button 40 is associated. Preferably, at least one button 40 or other selectable graphical element is arranged to initiate an application. For example, the heading 42 may comprise the textual descriptor for a particular container element 29, and the navigation window may display buttons 40 associated with each of the applications group or contained within that container element.

Those of skill in the art will appreciate that each button 40 may have a wide variety of shapes and sizes. In the embodiment illustrated, each button 40 is generally rectangular and is sized for selection by the finger-tip touch of a user on a touch-sensitive display. As also illustrated, each button 40 has indicia associated therewith indicating to the user the particular function with which the button 40 is associated.

Of course, a plurality of buttons 40 may be provided, one each for each of the various applications which may alternatively be displayed in the navigation tree. In a preferred embodiment, however, buttons 40 associated with some, but not all, of the applications are displayed. In one embodiment, buttons 40 are displayed for one or more related applications (as defined internally, such as in determining the contents of the common container element 31).

In this embodiment, there is also preferably provided a level navigation button 44. Input with this navigation button 44 preferably causes information associated with a previous level of information to be displayed. For example, in the event the elements of a particular container element 31 are being displayed, input to the level navigation button 44 causes the display of the container element 31 and other navigation selectable elements 29 of the high level which contains the container element 31 itself. Of course, a wide variety of navigation controls may be provided, including those which permit a user to navigate up or down through the levels in steps of one or more levels at a time.

In this arrangement, since only a few of the buttons 40 are displayed at one time, the buttons may be sized larger for easy user input or selection. In addition, the level navigation button 44 permits the user to display those buttons 40 which are arranged to initiate application which are located in higher levels or other groupings.

In the illustrated embodiment, a close button 46 is provided. Input to this button 46, such as by a finger touch, causes the particular application to stop or close, as is well known.

Referring again to FIG. 1, in one or more embodiments, the data display member 30 is arranged to display information. In a preferred embodiment, the data which is displayed is associated with an application selected from the navigation member 28. As stated above, a user may initiate an application with input to particular navigation screen elements 29. Information associated with the initiated application may be displayed in a variety of manners, such as in a window, panel, bar, or other manners known in the art. In the preferred embodiment, however, this information may be displayed by the data display member 30.

In one embodiment, when a particular application element is selected, data associated with that application may be displayed as a tabbed folder or page 50. The information which is displayed is dependent upon the application. In one embodiment, each application data folder 50 includes one or more data fields 52 in which data associated with the particular application is presented to a user. As illustrated, textual identifiers may be associated with each data field 52 to identify the data which is being displayed. Of course, the particular manner by which the data is displayed by the data display member 30 may vary.

In a preferred embodiment, the data display member 30 may display a plurality of folders 50. As illustrated, in one embodiment, when more than one folder 50 is displayed, only data fields 52 of the top folder 50 are visible. Other folders 50 are positioned behind the top folder, such that only a tab portion of those folders is visible. As illustrated, text or graphic information may be presented on the tab portion of each folder 50 for use by the user in identifying those folders 50 which are currently open. On one embodiment, a user may select an open folder 50, such as with a mouse pointer. This selection causes the selected folder 50 to be displayed as the top folder, whereby the data fields 52 are visible.

In one or more embodiments, the graphical user interface 20 of the invention includes a status bar 60. The status bar 60 preferably displays one or more elements of information at all times that the graphical user interface 20 is operational. In one embodiment, the status bar 60 comprises an elongate, rectangular element which is associated with the main window 22. As illustrated, the status bar 60 is positioned below the navigation member 28 and data members 30. In one or more embodiments, the status bar 60 may be used to display information such as user identification information, date, time, session or a wide variety of other information which is useful to a user when displayed at all times. In a preferred embodiment, the status bar 60 is visible at all times when the main window 22 is open.

Figure 3:
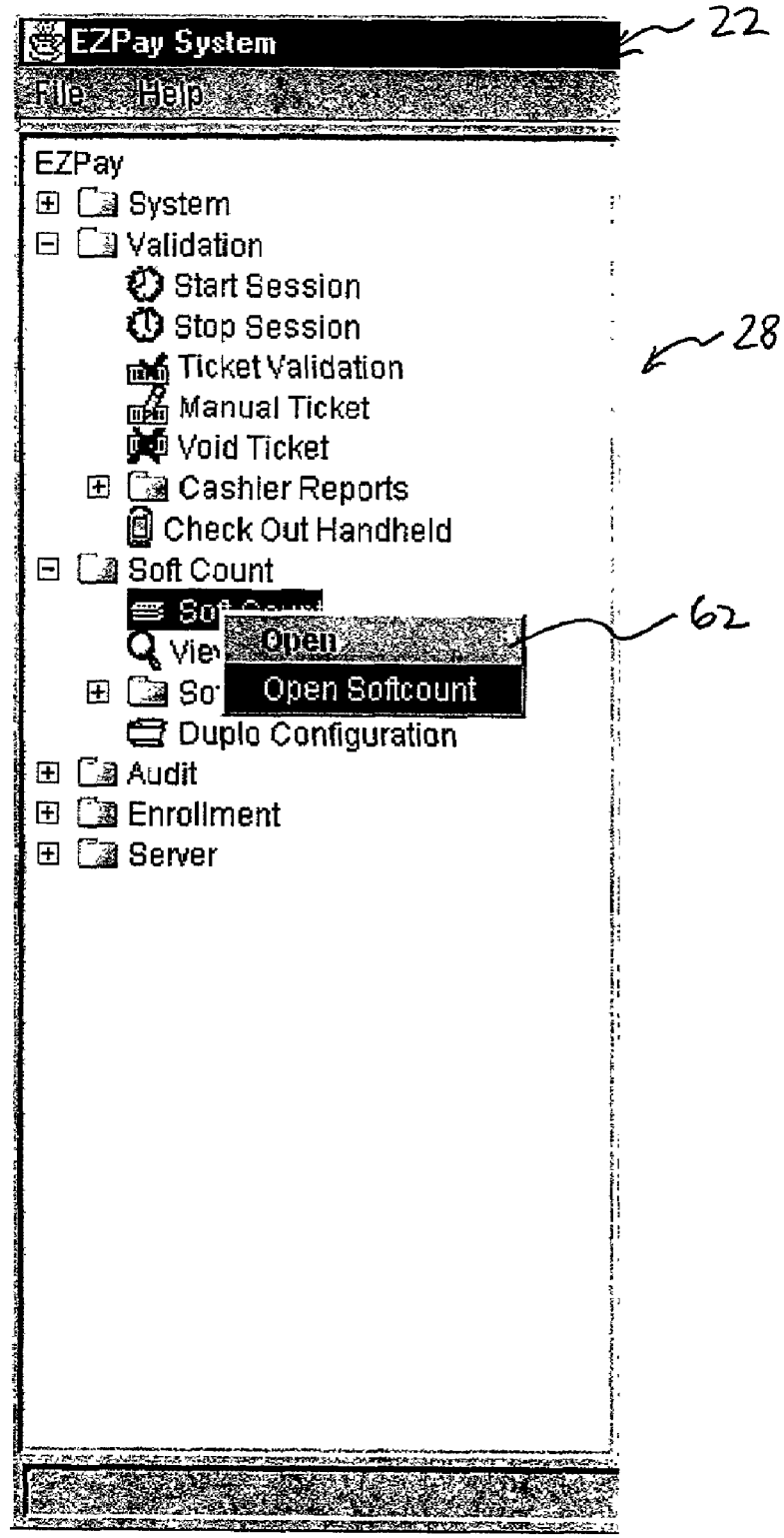
FIG. 3 illustrates another embodiment of a navigation element of a graphical user interface of the present invention.
Figure 8:
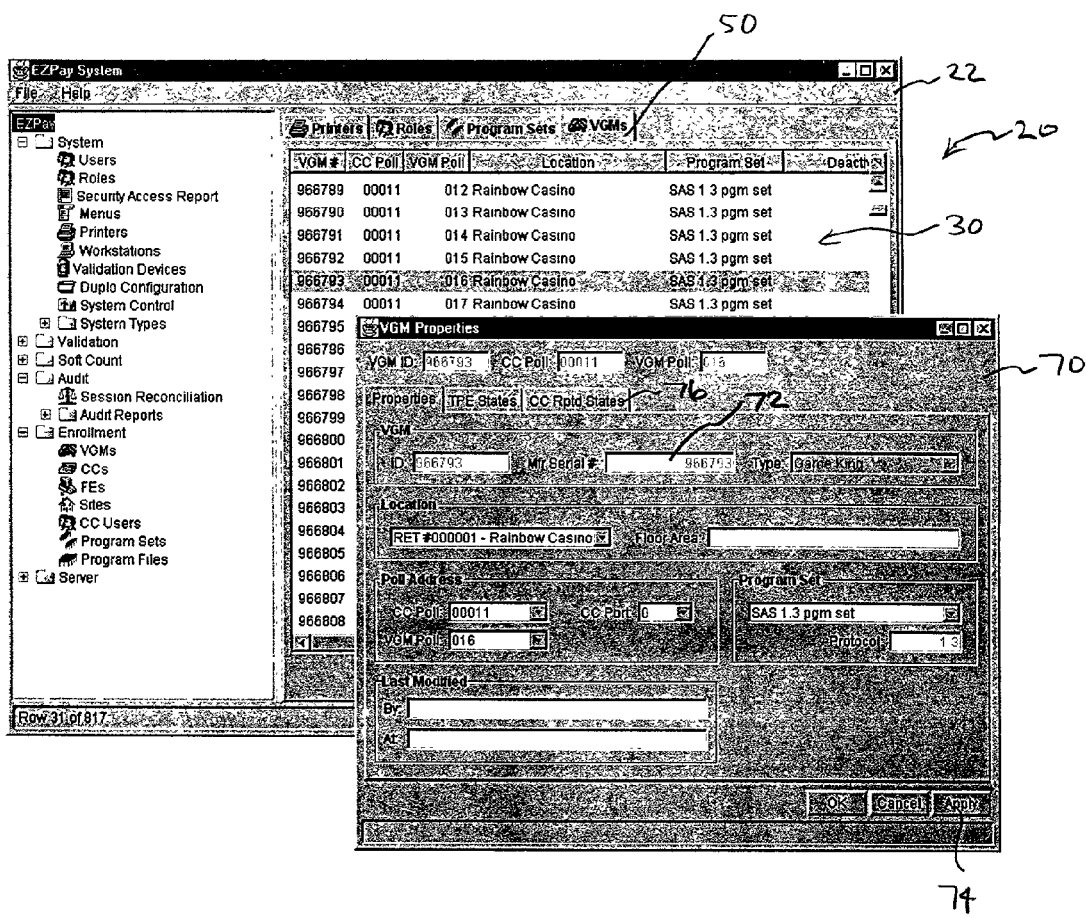
FIG. 8 illustrates an external window associated with a graphical user interface of the present invention.

In one or more embodiments, one or more external windows 62 or other elements may be associated with the graphical user interface 20. Referring to FIG. 3, such may comprise an element which is associated with, but which does not form a portion of, the main window 22 or its components. In one or more embodiments, the element may comprise a window in which information may be displayed, or may comprise a button, or panel including information, or other graphical element having a variety of forms and configurations. Another example of an external window 62 is illustrated in FIG. 8. This external window is arranged to display detailed information regarding one or more elements of the main window 22, as described in more detail below. External windows 62 may be provided for displaying menu information to a user, or for prompting input from a user, such as a password or the like.

In one embodiment, such an external window may be associated with an entirely different application from that which the graphical user interface 20 is associated. In another embodiment, a window 62 may be displayed which is associated with an element of the graphical user interface 20. For example, referring to FIG. 3, when a user selects an element from the navigation element 28 in a particular manner, an external window 62 may be displayed which presents information to the user. In one embodiment, the selection may comprise selecting an element displayed by the navigation element 28 with a mouse or other selector. The displayed window 62 may comprise a panel displaying information regarding various functions which may be initiated by the user.

In accordance with the present invention, there is provided a method of configuring a graphical user interface, such as the graphical user interface 20 described above. One embodiment of the invention comprises a method for configuring, including selecting or controlling the content which is displayed and its arrangement, the content of the information displayed by the graphical user interface 20.

Figure 4:
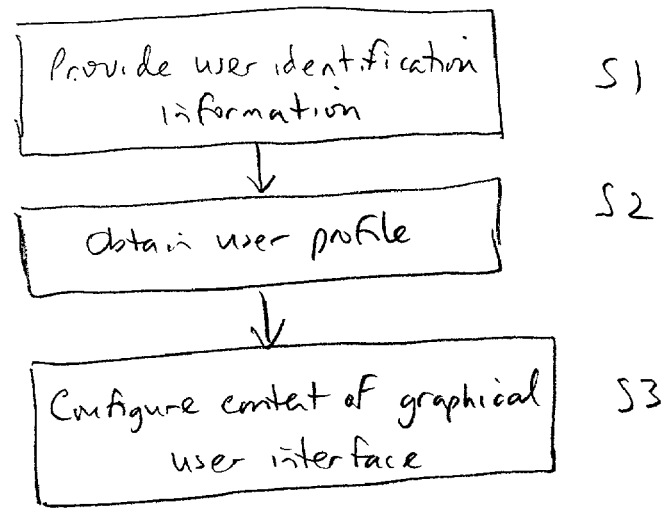
FIG. 4 is a flow diagram of a method of configuring a graphical user interface in accordance with the present invention.

An embodiment of one such method in accordance with the invention will be described with reference to FIG. 4. In a first step S1, user identification information is transmitted or provided to a processing device. This information may comprise a unique user identification code. In one or more embodiments, the information may comprise or include a password or other confirming information. This information may be provided in a wide variety of manners. For example, a user may enter the information using an input device such as a keyboard or touch screen. Alternatively, some or all of the data may be provided from an element to a reader device. For example, the user may be provided with a card having the information associated with a magnetic stripe or the like, and this information read from the card using a card reader.

In a second step S2, data regarding the user is obtained using the user's identification information. This information may be referred to as a user profile. In one embodiment, graphical user interface configuration data is stored in a file, such as in a memory associated with the processing device. The file is provided with an identification which associates it with one or more users. The information comprises information regarding the content or configuration of a graphical user interface which is to be displayed to the user.

In a step S3, the graphical user interface is configured to display only that content which the identified user is permitted to view, based on the user's profile. In one or more embodiments, the graphical user interface may be configured so that some, but not all, of the information which may be displayed by the navigation element 28 is displayed or displayable.

In a preferred embodiment, the graphical user interface 20 is capable of displaying a set of navigation selectable elements 29. In accordance with the method, the user's profile is utilized to determine which, if any, of the set of navigation selectable elements 29 are to be displayed to the user. Then, only those navigation selectable elements 29 which the user is permitted to view are displayed by the graphical user interface 20.

Figures 5A, 5B:
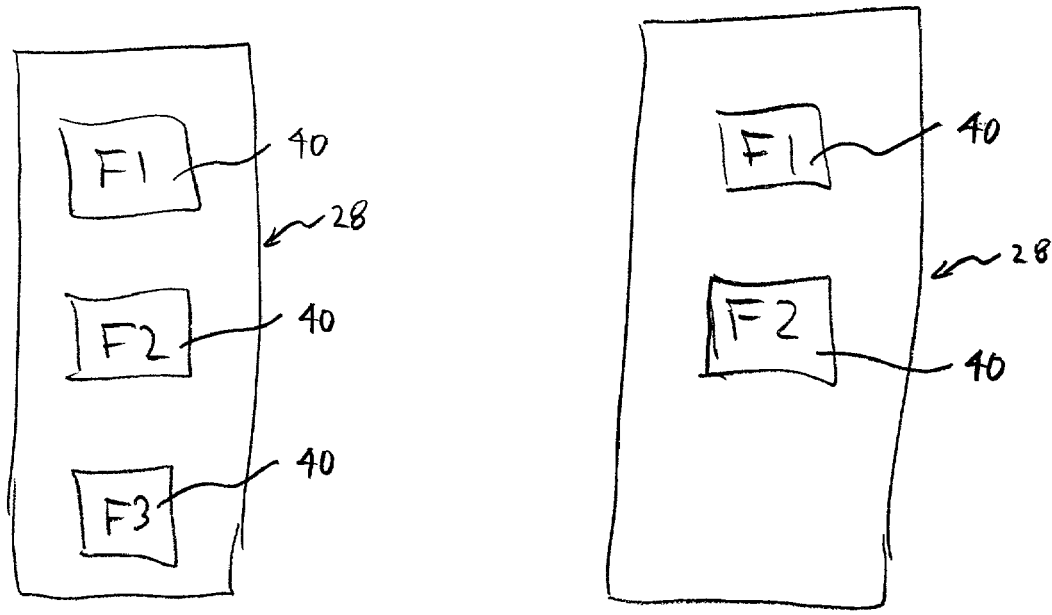
FIGS. 5(a) and 5(b) illustrate a graphical user interface configured in two different manners in accordance with the method illustrated in FIG. 4.

An example of this aspect of the invention will be described with reference to FIGS. 5(a) and 5(b). FIG. 5(a) illustrates a navigation element 28 which is displaying all information associated with an application which the graphical user interface 20 is configured to display. This information includes buttons 40 associated with functions F1, F2 and F3 of the application. In accordance with an embodiment of the invention, a particular user may be prevented from seeing that the application has a function F1 in accordance with the above-referenced method. FIG. 5(b) illustrates a configuration of the graphical user interface 20 specifically configured for a particular user, that being permitted to view only buttons 40 associated with functions F1 and F2.

As stated above, in a preferred embodiment of the invention, the graphical user interface 20 is arranged to permit a user to navigate through the various sub-applications/functions, such as by changing the information which is displayed by the navigation element 28 and selecting particular sub-applications for execution. For example, referring again to FIG. 1, in one embodiment, a user may select the "+" element of a container element 29 displayed in the navigation tree to cause the graphical user interface 20 to display the contents of the container element 29 and permit the user to select a sub-application initiating element 31. Alternatively, a user may be presented with the option of selecting the level button 44, thereby causing buttons 40 or selectable elements associated with a higher level of the application or other grouping to be displayed.

In accordance with the present invention there is provided a method for controlling the configuration, and more particularly, access to various elements displayed by the graphical user interface 20. In one embodiment, the graphical user interface 20 is adapted to display one or more of a set of elements which have a predetermined relationship. The method includes determining a point of access of the set of ordered elements, and permitting access to and display of certain of the elements via the graphical user interface.

Figure 6:
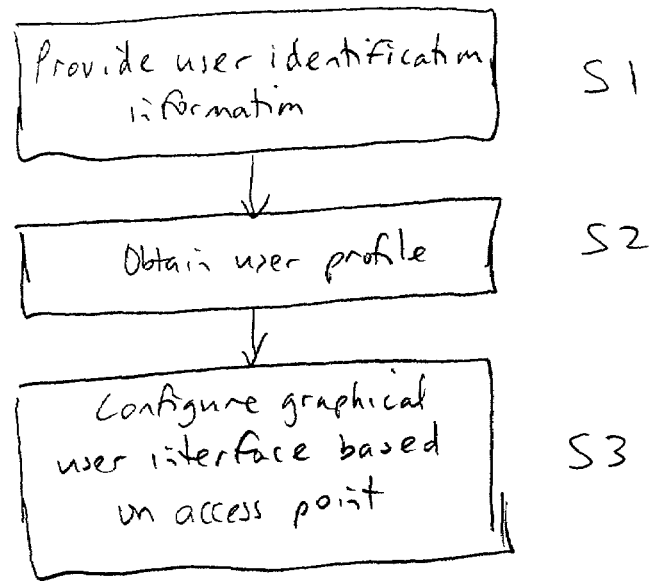
FIG. 6 is a flow diagram of a method of configuring a graphical user interface in accordance with another embodiment of the invention.

An embodiment of one such method in accordance with the invention will be described with reference to FIG. 6. In a first step S1, user identification information is transmitted or otherwise provided to a processing device. As with the method described above, this information may comprise a unique user identification code and/or a password or other confirming information. In a second step S2, data regarding the user, which may be referred to as a user profile, is obtained using the user's identification information. In one embodiment, navigation or access data is stored in a file, such as in a memory associated with the processing device. The file is provided with an identification which associates it with one or more users. The user identification information is utilized to configure the graphical user interface. In one or more embodiments, the step of configuring includes defining content of information which is displayed by the graphical user interface as well as the ability of the user to access other content. In a step S3, the graphical user interface is configured to display only the permitted content and prevent the user from accessing unpermitted content.

In a preferred embodiment, the graphical user interface 20 is capable of displaying a set of navigation selectable elements 29. These navigation selectable elements 29 are ordered or ranked. As described above, the navigation selectable elements 29 may be numerically ranked in linear sequence, or may be associated with particular levels or layers. In accordance with the method, the user's profile is utilized to determine an access point to the navigation selectable elements 29, the access point determining a portion of the navigation selectable elements which are accessible to the user and a portion of the navigation selectable elements which are not accessible to the user based on the order or ranking thereof. Based on this determination, the graphical user interface 20 is configured to display the navigation selectable elements 29, and is configured to limit (such as by preventing the selection and/or display) of other of the elements 29. In one embodiment, the user's profile determines an access point associated with ranked navigation selectable elements 29 or other information, which elements above the access point are not displayed or accessible, and which elements below the access point are displayed and accessible.

Figures 7A, 7B:
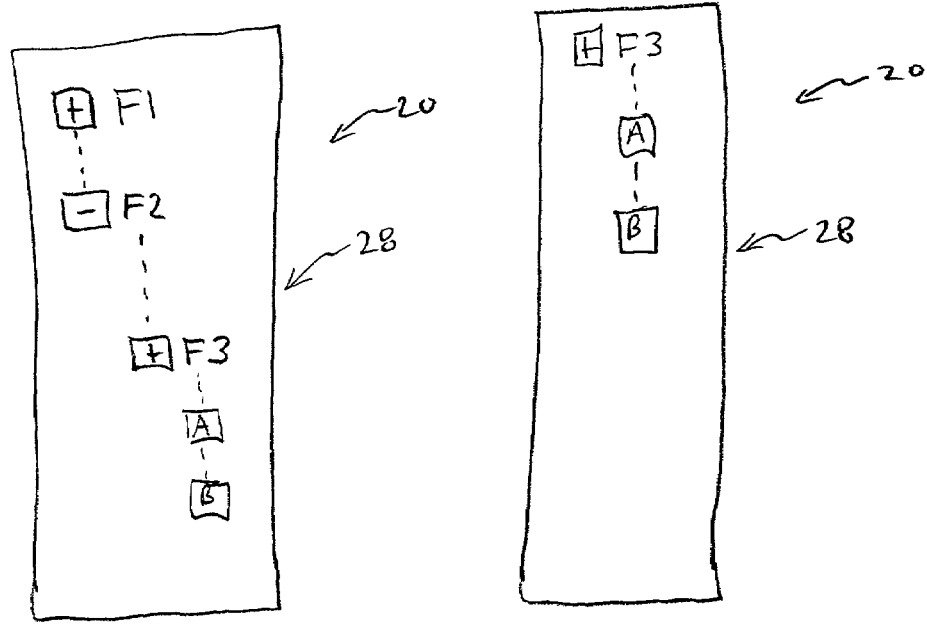
FIGS. 7(a) and 7(b) illustrate a graphical user interface configured in two different manners in accordance with the method illustrated in FIG. 5.

An example of this aspect of the invention will be described with reference to FIGS. 7(a) and 7(b). FIG. 7(a) illustrates a navigation element 28 which is displaying all information associated with an application which the graphical user interface 20 is configured to display. This information comprises a navigation tree listing functions F1, F2 and F3 having a particular interrelationship in which functions F1 and F2 are on the same level, and function F3 is a sub-function of function F2. In accordance with an embodiment of the invention, the graphical user interface is configured based upon an access or entry point. In the example illustrated, the user's access point comprises the level at which function F3 is located. In this embodiment, as illustrated in FIG. 7(b), the functions which are hierarchically above the entry point are not displayed (i.e. functions F1 and F2), nor is the user permitted to utilize the navigation element 28 to navigate to that higher level.

In one or more embodiments, the graphical user interface 20 includes a feature referred to herein as a row browser. As illustrated in FIG. 8, in one or more embodiments, the graphical user interface 20 is arranged to display information in the data viewport in row and column format. In one embodiment, information or data associated with a particular application, function or other element is illustrated in the folder or tabbed page 50 in a summary format. In one embodiment, where multiple elements are associated with the particular function or application, this limited or subset information is displayed for each element. In a particular embodiment, one row of information is provided regarding one particular element. In one or more other embodiments, summary or abbreviated information regarding a plurality of elements may be displayed in other formats, such as in a column format. Preferably, however, regardless of the format, the data display 30 is arranged in one or more embodiments to display in an abbreviated format similar or related information regarding a plurality of similar or related elements.

In a preferred embodiment, the graphical user interface 20 permits a user to access or view a greater amount of data than that displayed in the data viewport. In one embodiment, a user may select a particular element or item from the row data, such as with a mouse pointer. As illustrated in FIG. 8, when the row element is selected, a properties window 70 or other element is displayed which displays greater information regarding the element than is displayed in the row data of the tabbed page 50. In another embodiment, the properties window 70 may be displayed by the user selecting a "properties" or other command button or link.

As stated, in the preferred embodiment, the greater detail of the properties information is displayed in a new window or element 70. In this manner, the user may still see the underlying main window 22 and information displayed in association therewith. In one embodiment, the user may maximize or minimize the size of the new window 70, as is desired. In one or more other embodiments, the detailed property information may actually be displayed in the tabbed page 50 in replacement of the row data.

As illustrated, in one or more embodiments, the detailed property window 70 may permit input by a user for performing a variety of activities. For example, a user may input data into one or more data fields 72. Changes to particular properties may be entered by input to an "apply" or similar button 74. As also illustrated, the detailed properties window 70 may includes one or more tabbed pages or folders 76 which the user may select for displaying different property data.

In yet another embodiment of the invention, when a user selects a particular row of information or other summary information element which is displayed in the data viewport, the user is presented with the option of changing particular characteristics of the properties window(s) 70. One or more embodiments of the invention comprise a method which permits a user to cause the graphical user interface 20 to display detailed property information regarding each element associated with a row in a separate window 70, or to have such information be displayed in the same window 70. If the user selects the first option, upon selecting a particular row element, a first detailed properties window 70 is displayed which displays information regarding that row element. If the user then selects another row element, a second detailed properties window 70 is displayed which displays information regarding that second row element, and so on. In this manner, the user is permitted to view the detailed property information regarding several row elements at the same time.

If the second option is selected, upon selecting a particular row element, a detailed properties window 70 is displayed which displays information regarding that row element. If the user then selects another row element, property information regarding that row element is presented in the already displayed window (in replacement of the information displayed regarding the previously selected row element).

In accordance with another method of the invention, there is provided what is referred to as an "automatic refresh" feature. In accordance with this aspect of the invention, when more than one folder 50 is being displayed in the data viewport and information is changed in one folder 50, all other related information in other folders 50 is updated or refreshed automatically (i.e. without particular user intervention).

In accordance with another aspect of the invention, a method is provided for configuring the layout of a graphical user interface 20. In accordance with one embodiment, the location of one or more elements of the graphical user interface 20 is user or device-specific. One embodiment of the invention comprises a method similar to that illustrated in FIGS. 4 and 6 and described above, where a user provides identification information and a user profile or configuration information is determined using the user identification information. In this method, the layout or arrangement of the graphical user interface 20 is determined from the user identification information and the graphical user interface 20 then displays the information in accordance with this layout.

In one or more embodiments, the method includes arranging the navigation and data display elements 28,30. For example, in one layout, the navigation and data display elements 28,30 may be arranged side-by-side as illustrated in FIG. 1. In another embodiment, the position of the navigation and data display elements 28,30 may be reversed. In other embodiments, the position of the navigation and data display elements 28,30 may be arranged vertically or in any other configuration.

In another embodiment, the method includes determining the format of the navigation selectable elements 29. In one embodiment, the navigation selectable elements 29 may be illustrated as part of a navigation tree, as illustrated in FIG. 3. Alternatively, the navigation selectable elements 29 may be illustrated as buttons 40 or other touch-input graphical elements or icons, as illustrated in FIG. 2.

As described in more detail below, these aspects of the invention are particularly useful in configuring the graphical user interface 20 for a particular user, where each user's needs differs. The layout of the navigation and data display elements 28,30 may be reversed depending upon whether the user is left or right handed. For example, a user of a hand-held device may elect to have the navigation selectable elements 29 displayed on the left-hand side of the graphical user interface 20, so that they may use their left-hand thumb to select the navigation selectable elements 29 while holding the device. In addition, the user may elect to have the navigation selectable elements 29 displayed as buttons 40 or other touch-input arranged elements to permit thumb input.

The methods and apparatus of the invention may be implemented by and one a wide variety of devices. In one embodiment, the invention is associated with a computing device having a processor, a main memory and a video memory coupled to a video amplifier. The video amplifier is used to drive the CRT, flat panel, liquid crystal display (LCD), or any other suitable display device. In one embodiment, the display device comprises a touch-sensitive device, whereby a user may make an input by touching the display with a finger, wand or the like, as is well known. In one or more other embodiments, the computing device may include a keyboard and mouse. The computing device may include a mass storage device.

Figure 9:
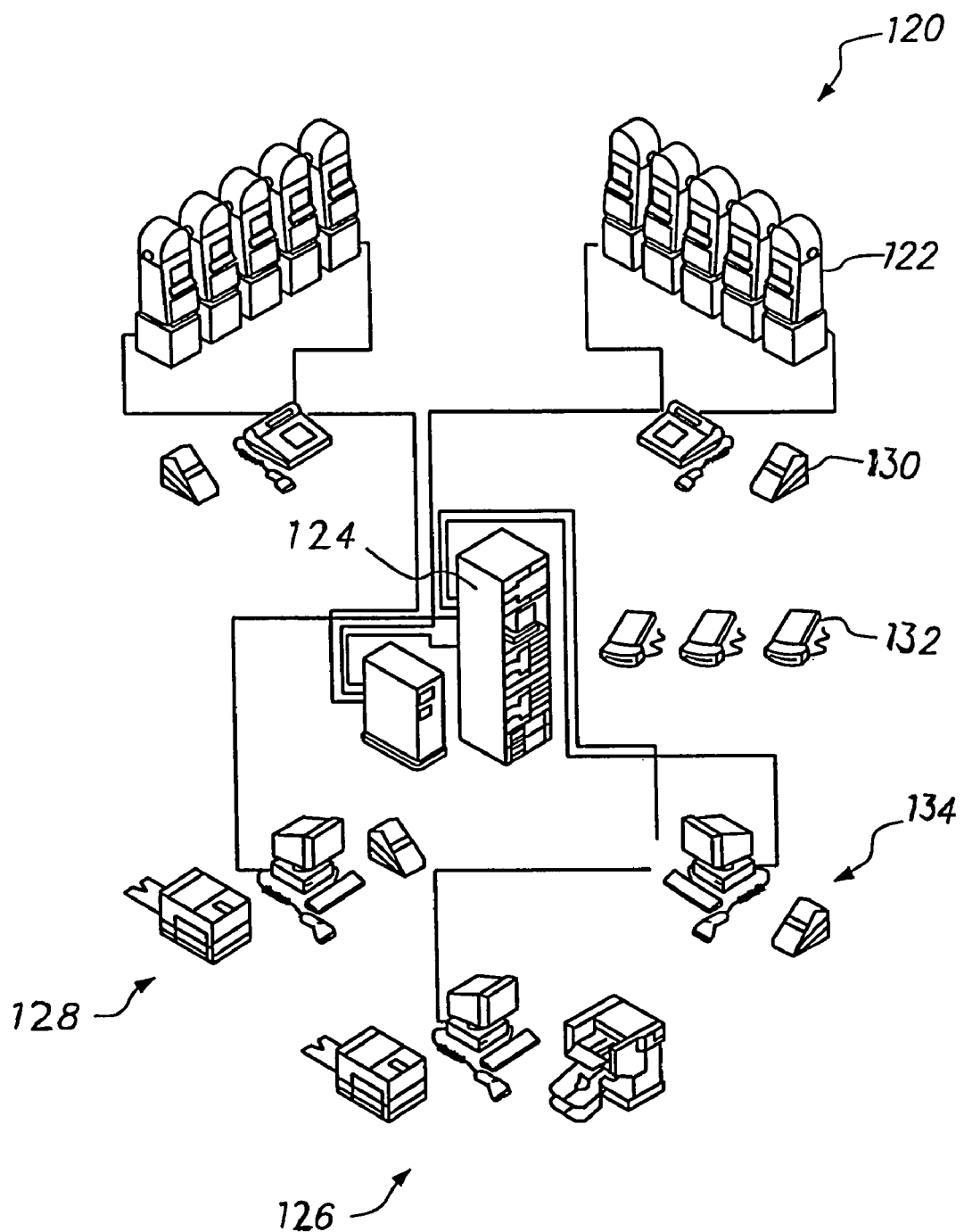
FIG. 9 illustrates one environment of use for a graphical user interface in accordance with the present invention.

In one or more embodiments of the invention, the method and apparatus are associated with a gaming system 120. One embodiment of such a system is illustrated in FIG. 9, and includes one or more gaming devices 122 associated with a central computing device or host 124. One or more appropriate communications links, whether wired or wireless, permit information to be transferred to and from each gaming device 122 and the central host 124. The central host 124 may comprise a single computer or a group of computers associated with one another on a network.

The gaming devices 122 may comprise a wide variety of elements. For example, the gaming devices 122 may comprise machines adapted to present slot or video games for play by a user. In a preferred embodiment, the gaming devices 122 are arranged to accept wagers and, in the event a winning outcome is achieved, pay out winnings to a player. Such games are well known and may comprise gaming devices currently in use and those later developed. In one embodiment of the system 120, the gaming device 122 are arranged to dispense and accept vouchers or tickets in addition to, or in replacement of, currency or coin monies.

In one embodiment, the central host 124 includes at least one data storage element for storing information. The data storage element may comprise a hard drive, RAM, ROM, tape drive, CD or other members or elements. The central host 124 also includes necessary communications equipment, such as network cards or the like for receiving and sending information.

In one or more embodiments, a plurality of other device are associated with the system 120. A soft count system 126 is associated with the host 124. The soft count system 126 is arranged to sort currency and vouchers or tickets which have been accepted by the gaming machines 122 and perform a variety of other functions, including verifying authenticity of the vouchers and reconciling the vouchers against those which have been recorded as having been received and paid (i.e. credited) by the particular gaming machine 122.

An audit system 128 may be associated with the gaming system 120. The audit system 128 may be used to poll the host 124 and confirm the proper operation of the system 120. The audit system 128 may also be used by controllers of the system 120 to change operational parameters of the system 120.

One or more clerk validation mechanisms 130, wireless cashier terminals 132 and cashier cage systems 134 may be associated with the gaming system 20. The manner by which information from these mechanisms, terminals and systems is transmitted to and from other mechanisms, terminals and systems may vary, as known in the art. For example, as illustrated, the wireless cashier terminals 132 transmit and receive information from the central host 124 via a wireless communications link. The other systems, including the soft count system 126, clerk validation mechanisms 130 and cashier cage systems 134 are illustrated as being hard wired to the central host 124.

The clerk validation mechanisms 130, wireless cashier terminals 132 and cashier cage systems 134 may be arranged to include a variety of apparatus, including both hardware and software, for performing a variety of functions. In one or more embodiments, these mechanisms 130, terminals 132 and systems 134 may include voucher or ticket issuing or printing devices, voucher scanning or reading devices and receipt printing devices. In this manner gaming personnel may issue vouchers to players and players may cash-in vouchers after play at a variety of locations. In one embodiment, one or more of the devices of the system 120 comprise devices in which the means of user input is limited. For example, in a preferred embodiment, the wireless cashier terminals 132 comprise hand-held portable devices which include a touch-sensitive screen, but which do not include a mouse or the like, such that input is substantially limited to use of the screen. On the other hand, the audit system 128 and other devices associated with the system 120 may include a wide variety of input devices such as a keyboard and a mouse.

In one or more embodiments of the invention, the graphical user interface 20 is adapted to present information related to, and permit user interaction with, a gaming system accounting application. The application may be adapted to perform a wide variety of functions and include a number of sub-applications. In the embodiment illustrated in FIG. 1, the accounting application, referred to as the "EZPAY" application, includes grouped applications or functions of referred to as "system management," "validation," "soft count," "audit," "enrollment" and "server". As illustrated, a container element is representative of each of these groupings applications. The grouped applications or functions are associated with their respective container element. For example, the applications or functions "session start" and "ticket void" are associated with the validation grouping. In addition, the validation grouping includes another sub-grouping. Namely, the group "cashier reports" (which is itself represented by a container element associated with the validation container element) includes one or more applications. In this embodiment, a first level may include the container elements representing all of the main groupings. A second level may contain only the groupings/container elements and/or application initiating elements of a particular main grouping. A third level may contain only the container elements and/or application initiating elements of a particular container element of a main grouping. Of course, those of skill in the art will appreciate that the elements may be arranged in a variety of hierarchies, as desired.

FIG. 1 illustrates these applications presented in the navigation tree format described in detail above. FIG. 2 illustrates the graphical user interface as configured to display only those elements associated with a second level of the validation grouping in a button-type format as detailed above.

In the system 120 as described above including the gaming system accounting application, many different users interface with the application through the various devices associated with the system. For example, cashiers roaming the floor of a casino may utilize the wireless, hand-held devices 130 to validate player vouchers and exchange currency for a voucher. Casino accounting personnel may interface with the system 120 using the audit system 128, and casino financial personnel may interface with the system 120 using the soft-count system 126.

It is desirable to limit access of one or more of these users to only certain aspects of the application. For example, the soft count sub-application is a very specific application which needs to be accessed by the casino financial personnel, but not the cashiers. In accordance with the method of the invention, the user definition or profile for the cashiers is defined to prevent the graphical user interface 20 from displaying information regarding or associated with the soft count application. Further, in a preferred embodiment, the point of access for the cashiers is the level including the subfunctions of the validation application. Such a point of access is illustrated in FIG. 2, wherein the graphical user interface only identifies the validation application and its sub-applications. In this configuration, the cashiers are prevented from utilizing the level button 44 or other navigation tools to gain access to other portions of the application or change the configuration of the graphical user interface 20.

A variety of other aspects of the invention are contemplated as within the scope of the invention other than that described above, some of which are described below. In one or more embodiments, the information which is utilized to determine the configuration/layout/content of the graphical user interface 20 of the invention need not comprise user identification information per se. For example, in one embodiment, the graphical user interface 20 may be arranged dependent upon the device which a user utilizes. The graphical user interface 20 may be configured in one manner for a device which includes external input devices such as a mouse and/or keyboard. The graphical user interface 20 may be configured in another manner for a device which does not include such input devices, but which has as its primary input element a touch-sensitive display.

In one or more embodiments, the configuration information or profile need not be unique to each and every user, but one or more users may share a common or group profile. In one embodiment, the identification information may be input by a user through a keyboard, touch-input or the like. In other embodiments, the information may be provided from an external element, such as a coded card, via a variety of input devices. The identification information may be dependent upon a physical characteristic of the user, such as a fingerprint, retinal scan or the like.

In one or more embodiments, various aspects of the invention may be combined. For example, in accordance with the invention, the user's profile may be used to configure the graphical user interface 20 to both in terms of the information which is accessible and which is displayed. For example, a particular user may be permitted to only view and access elements or information associated with a second and third level (but not first), and in addition, certain of the information on even these levels may be removed from display to the user.

In one or more embodiments, it will be appreciated that a particular user may be permitted to access and view all of the information which the graphical user interface 20 is capable of displaying. In other embodiments, the user may be permitted to view only very limited and select information.

A variety of means of input and interaction with the graphical user interface 20 are contemplated, as well known in the art. For example, buttons and similar graphical elements may be selected using a touch-screen, mouse-pointer or keyboard controls (such as using arrows to move highlight elements and use of the "enter" or similar button). In one or more embodiments, the user may effect an action by selecting a particular menu or other item. For example, a user may cause a particular action to occur by selecting the action from a menu, such as "open," "close," "show properties," or the like. In other embodiments, such actions may be effected with a short-cut, such as by selecting the item with a mouse-pointer and "right-clicking" a mouse.

The shapes, sizes, colors and other characteristics of the graphical user interface 20 may vary. In a preferred embodiment, when the primary input to the graphical user interface 20 is via a touch-sensitive screen or display, then it is preferred that the selectable elements be of a size and shape which are suitable for selection by a finger of a user or other element (such as a wand or stylus). In general, in such a configuration the elements will be of a larger size than when input may be provided with a mouse-pointer or other more accurately controllable input element.

In one or more embodiments, of the invention comprises computer readable program code which is arranged to cause a computer to execute the methods described above. The computer readable-program code may be associated with a computer usable medium, such as a disk, tape, or the like. One or more embodiments of the invention comprise a computing device which includes a processor or processing means, at least one input device, at least one display for displaying the graphical user interface, and means for configuring the graphical user interface in accordance with the present invention. As will be appreciated, the means may comprise the above-referenced computer readable program code. In one or more embodiments of the invention, this code may be embodied in hardware, such as a chip.

A variety of advantages are realized with the methods and apparatus of the present invention. First and foremost, a graphical user interface is provided which is particularly user friendly. In accordance with the invention, the graphical user interface displays both navigation information and tools, and data regarding particular functions or applications, all in the same viewing window. In addition, the graphical user interface is specifically configured for each user, whereby content which is not necessary to the performance of the user's tasks are not illustrated, reducing the amount of information displayed by the graphical user interface. The graphical user interface displays data regarding a plurality of elements in a summary row format which is conveniently readable by a user. The graphical user interface also displays detailed data regarding elements in a detailed properties window.

The invention includes a method for particularly configuring a graphical user interface in a user-specific manner. As described, in one embodiment, the content of information which is displayed by the graphical user interface is user-specific, such as determined from a user profile. In this manner, multiple users can utilize the same system, but the content which is displayed to each user can be carefully controlled. This allows, for example, the operator of the system to access all aspects of the system, but prevent certain users from viewing particular content.

The invention also includes a method for controlling the navigation of a graphical user interface in a user-specific manner. As described, in one embodiment, a point of access to the application(s) with which the graphical user interface is defined, and the graphical user interface is configured to display information pertinent only to that point of access, and not to permit navigation to areas of the application(s) above the point of access. In this manner, multiple users can utilize the same system, but the ability of the user to access various aspects of the system can be limited.

Based on the user or the device which the user is using, the graphical user interface can be specifically configured. As noted above, the graphical user interface can be arranged for easier use by left or right-handed users, or for use on hand-held devices.

In one embodiment, the graphical user interface is arranged to display summary data regarding a plurality of elements in the data viewport. This permits a user to quickly scan and compare data regarding the numerous elements. On the other hand, the graphical user interface is capable of displaying detailed data to a user as well. In one embodiment, detailed information regarding multiple elements may be displayed for easy comparison by a user as well.

The graphical user interface includes a variety of convenient features, such as the automatic updating or refreshing of data which is being displayed when related data is changed or changes. The user is provided with the option of having all associated windows closed when a single window is closed, reducing the work by the user.

It will be understood that the above described arrangements of apparatus and the method therefrom are merely illustrative of applications of the principles of this invention and many other embodiments and modifications may be made without departing from the spirit and scope of the invention as defined in the claims.

We claim:

1. A method of configuring a graphical user interface associated with an application executed by a computing device of a gaming system, said gaming system including at least one gaming device adapted to accept a wager by a player, present a game, and grant an award for predetermined winning events comprising the steps of:

providing a set of navigation selectable elements;

accepting a first input from a given user of said gaming system;

accepting a second input from an operator of said gaming system;

providing a user identification associated with said given user;

determining a user profile from said user identification;

determining which elements from said set of navigation selectable elements that said user is permitted to view in accordance with said user profile; and displaying only said navigation selectable elements said user is allowed to view, wherein said resulting display is customized to the user based at least in part upon said first input and said second input.

2. The method in accordance with claim 1 wherein said navigation selectable elements include container elements.

3. The method in accordance with claim 1 wherein said navigation selectable elements comprise application initiating elements.

4. The method in accordance with claim 1 wherein said navigation selectable elements are arranged in a hierarchical format.

5. The method in accordance with claim 1 including the step of displaying one or more of said navigation selectable elements as buttons.

6. The method in accordance with claim 1 including the step of displaying said navigation selectable elements in a tree form.

7. The method in accordance with claim 1 including the step of displaying the displayed navigation selectable elements in a form dependent upon said user profile.

8. The method in accordance with claim 1 wherein said user profile is associated with a device which displays said graphical user interface.

9. A method of configuring a graphical user interface associated with an application executed by a computing device of a gaming system, said gaming system including at least one gaming device adapted to accept a wager by a player, present a game, and grant an award for predetermined winning events comprising the steps of:

providing a set of navigation selectable elements, said set of navigation selectable elements having a predetermined order;

accepting a first input from a given user of said gaming system;

accepting a second input from an operator of said gaming system, wherein said operator is an employer of said given user;

providing a user identification associated with said given user;

determining a user profile from said user identification;

determining an access point for said ordered navigation selectable elements for said given user from said profile, said access point determining a portion of said navigation selectable elements which are accessible to said given user and a portion of said navigation selectable elements which are not accessible to said given user based on said order thereof; and displaying only one or more of said navigation selectable elements which are accessible to said given user, wherein said resulting display is customized to the given user based at least in part upon said first input and said second input.

10. The method in accordance with claim 9 wherein said navigation selectable elements are arranged into one or more levels, said access point comprises one of said levels.

11. The method in accordance with claim 10 wherein navigation selectable elements associated with one or more levels higher than the level with which said access point is associated are not accessible to said user.

12. The method in accordance with claim 9 including the steps of determining a configuration for said navigation selectable elements based upon said user profile and displaying said navigation selectable elements in accordance with said configuration.

13. The method in accordance with claim 9 including the steps of determining if said user is restricted from viewing one or more of said navigation selectable elements based upon said user profile and preventing the display of those elements.

14. A gaming system comprising:

a computing device adapted to accept a first input from a given user of said gaming system and a second input from an operator of said gaming system;

at least one gaming device associated with said computing device, said gaming device adapted to accept a wager by a player, present a game, and grant an award for predetermined winning events;

at least one first user station and at least one second user station associated with said system for displaying information and for providing input to said computing device; and a graphical user interface for displaying said information, said graphical user interface including:

a main window having a navigation viewport displaying one or more navigation selectable elements, one or more of said one or more navigation selectable elements comprising an application initiating element, and a data viewport arranged to display information associated with an application initiated by selection of one of said one or more application initiating elements, wherein said graphical user interface is adapted to display said navigation selectable elements in a plurality of configurations dependent upon a configuration of a station on which said graphical user interface is displayed or a user profile, and wherein said resulting display is customized to the user based at least in part upon said first input and said second input wherein said gaming system accounting system comprises a soft count system arranged to sort currency, vouchers, tickets, or any combination thereof that have been accepted by one or more gaming devices within said gaming system.

15. The gaming system in accordance with claim 14 wherein said soft count system is arranged to verify the authenticity of accepted vouchers or tickets and reconcile said accepted vouchers or tickets against those that have been recorded as having been received and paid by said one or more gaming devices within said gaming system.

16. The gaming system in accordance with claim 14 wherein said gaming system accounting system is adapted for use by casino financial personnel and cashiers, wherein at least one user profile for one cashier does not permit the display of soft count information to said cashier on said gaming system.

17. A gaming system comprising:
- a computing device adapted to accept a first input from a given user of said gaming system and a second input from an operator of said gaming system;
- at least one gaming device associated with said computing device, said gaming device adapted to accept a wager by a player, present a game, and grant an award for predetermined winning events;
- at least one first user station and at least one second user station associated with said system for displaying information and for providing input to said computing device; and a graphical user interface for displaying said information, said graphical user interface including:
- a main window having a navigation viewport displaying one or more navigation selectable elements, one or more of said one or more navigation selectable elements comprising an application initiating element,
- and a data viewport arranged to display information associated with an application initiated by selection of one of said one or more application initiating elements, wherein said graphical user interface is adapted to display said navigation selectable elements in a plurality of configurations dependent upon a configuration of a station on which said graphical user interface is displayed or a user profile, and
- wherein said resulting display is customized to the user based at least in part upon said first input and said second input wherein said gaming system accounting system comprises an audit system adapted to poll a host of said gaming system to confirm proper operation of the system.

18. A method of configuring a graphical user interface associated with a gaming system, said gaming system including at least one gaming device adapted to accept a wager by a player, present a game, and grant an award for predetermined winning events comprising the steps of:
- providing a set of navigation selectable elements, at least one navigation selectable element comprising a level navigation button, wherein said level navigation button is not made available to all users of said gaming system;
- accepting a first input from a given user of said gaming system;
- accepting a second input from an operator of said gaming system, wherein said operator is an employer of said given user;
- providing a user identification associated with said given user;
- determining a first user profile from said user identification, said first user profile being determined from a set of user profiles, wherein at least one of said user profiles comprises a common user profile shared by a plurality of users of said gaming system;
- determining which elements from said set of navigation selectable elements that said given user is permitted to view in accordance with said first user profile; and
- displaying only said navigation selectable elements said given user is allowed to view, wherein said resulting display is customized to the given user based at least in part upon said first input and said second input.

19. The method in accordance with claim 18 wherein said gaming system accounting system comprises a soft count system arranged to sort, reconcile and verify the authenticity of currency, vouchers, tickets, or any combination thereof that have been accepted by one or more gaming devices within said gaming system, and wherein said gaming system accounting system is adapted for use by casino financial personnel and cashiers, wherein at least one user profile for one cashier does not permit the display of soft count information to said cashier on said gaming system.

* * * * *